US009425490B2

(12) United States Patent
Suga

(10) Patent No.: US 9,425,490 B2
(45) Date of Patent: Aug. 23, 2016

(54) STORAGE BATTERY SYSTEM

(75) Inventor: Atsuo Suga, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1233 days.

(21) Appl. No.: 13/076,556

(22) Filed: Mar. 31, 2011

(65) Prior Publication Data

US 2011/0262784 A1    Oct. 27, 2011

(30) Foreign Application Priority Data

Apr. 27, 2010  (JP) .................................. 2010-102610

(51) Int. Cl.
| H01M 10/50 | (2006.01) |
| H01M 10/48 | (2006.01) |
| H01M 10/633 | (2014.01) |
| H01M 10/6568 | (2014.01) |
| H01M 10/613 | (2014.01) |
| H01M 10/6554 | (2014.01) |
| H01M 10/6563 | (2014.01) |

(52) U.S. Cl.
CPC .......... H01M 10/486 (2013.01); H01M 10/613 (2015.04); H01M 10/633 (2015.04); H01M 10/6554 (2015.04); H01M 10/6568 (2015.04); H01M 10/6563 (2015.04)

(58) Field of Classification Search
CPC ............ H01M 10/486; H01M 10/633; H01M 10/6563; H01M 10/6568; H01M 10/613; H01M 10/6554
See application file for complete search history.

(56) References Cited

U.S. PATENT DOCUMENTS

| 7,531,269 B2* | 5/2009 | Wegner .......................... 429/120 |
| 2003/0096160 A1* | 5/2003 | Sugiura et al. ................ 429/120 |
| 2008/0233470 A1* | 9/2008 | Zhu et al. ......................... 429/90 |
| 2008/0251246 A1* | 10/2008 | Ohkuma et al. ............... 165/287 |
| 2009/0142653 A1* | 6/2009 | Okada et al. .................. 429/120 |
| 2009/0220850 A1* | 9/2009 | Bitsche et al. .................. 429/50 |

FOREIGN PATENT DOCUMENTS

| EP | 1 052 757 A2 | 11/2000 |
| JP | 10-106638 A | 4/1998 |
| JP | 2001-313092 A | 11/2001 |
| JP | 2005-293971 A | 10/2005 |
| JP | 2010-67515 A | 3/2010 |

OTHER PUBLICATIONS

Machine translation of Japanese Patent Document No. JP 10-106638, Apr. 24, 1998.*
Extended European Search Report dated Jan. 30, 2013 (five (5) pages).
Japanese Office Action with English translation dated Oct. 1, 2013 (Seven (7) pages).

* cited by examiner

Primary Examiner — Carlos Barcena
Assistant Examiner — Lilia V Nedialkova
(74) Attorney, Agent, or Firm — Crowell & Moring LLP

(57) ABSTRACT

A storage battery system includes: a secondary battery; a holding member comprising a flow channel of a cooling medium for cooling the secondary battery, which holds the secondary battery; a medium temperature measuring unit that measures temperatures T1 and T2 of the cooling medium at two locations in the flow channel; a battery temperature measuring unit that measures a temperature T3 of the secondary battery; and a judging unit that repetitively calculates a coefficient α and that judges a cooling performance of the secondary battery based on a variation of the coefficient α, the coefficient α being defined as (T3−T1)/(T2−T1), (T3−T2)/(T2−T1), or (T3−T2)/(T3−T1).

7 Claims, 12 Drawing Sheets

STORAGE BATTERY SYSTEM

INCORPORATION BY REFERENCE

The disclosure of the following priority application is herein incorporated by reference:

Japanese Patent Application No. 2010-102610 filed Apr. 27, 2010.

BACKGROUND OF THE INVENTION

1. Field of the Invention

The present invention relates to a storage battery system using a secondary battery.

2. Description of Related Art

Performance and life time of a secondary battery strongly depend on the temperature of the secondary battery. Since the likelihood of deterioration increases at high temperatures, with a secondary battery system that requires a large current such as that of a hybrid vehicle, a cooling performance of a cooling system during charge and discharge must be accurately monitored. Cooling methods of secondary batteries can be divided into two methods, namely, an air-cooling method in which air is supplied by a fan to cool a secondary battery and a liquid-cooling method in which a liquid cooling medium is circulated to a secondary battery to transfer heat to the outside. Conceivable causes of degradation of a cooling performance in an air-cooling method include fan failure and accumulation of dust and extraneous matter on the secondary battery or in a draft air duct. Conceivable causes of degradation of a cooling performance in a liquid-cooling method include a failure of a pump that circulates a cooling medium, a change in components of the cooling medium, and deterioration due to metal corrosion in a cooling medium flow channel. As a technique for judging an abnormality in the cooling performance of such a secondary battery cooling system, Japanese Patent Laid-Open No. 2001-313092 discloses a storage battery system configured so as to estimate a temperature of a secondary battery from a charge and discharge current and a cooling state of the secondary battery, and to judge an abnormality in cooling performance by comparing the estimated temperature with a measured temperature of the secondary battery.

SUMMARY OF THE INVENTION

However, with the conventional storage battery system described above, since a battery temperature is estimated based on an amount of heat generation due to a charge and discharge current of a secondary battery, ambient temperature, an operating mode of a fan, a history of estimated temperatures, and the like, there is a problem in that an estimate contains error and whether or not the cooling performance of a battery cooling system is normal cannot be judged accurately.

According to the 1st aspect of the present invention, a storage battery system comprises: a secondary battery; a holding member comprising a flow channel of a cooling medium for cooling the secondary battery, which holds the secondary battery; a medium temperature measuring unit that measures temperatures T1 and T2 of the cooling medium at two locations in the flow channel; a battery temperature measuring unit that measures a temperature T3 of the secondary battery; and a judging unit that repetitively calculates a coefficient α and that judges a cooling performance of the secondary battery based on a variation of the coefficient α, the coefficient α being defined as (T3−T1)/(T2−T1), (T3−T2)/(T2−T1), or (T3−T2)/(T3−T1).

According to the 2nd aspect of the present invention, the judgment unit of a storage battery system according to the 1st aspect may judge that the cooling performance of the secondary battery is abnormal when a difference between a currently calculated value and a previously calculated value of the coefficient α exceeds a range set in advance.

According to the 3rd aspect of the present invention, the medium temperature measuring unit of a storage battery system according to the 1st aspect may measure temperatures T1 and T2 at an entry-side and an exit-side of the holding member of the flow channel passing through the holding member.

According to the 4th aspect of the present invention, it is preferred that the holding member of a storage battery system according to the 1st aspect holds the secondary battery via a thermal conductive sheet.

According to the 5th aspect of the present invention, it is preferred that in a storage battery system according to the 4th aspect, the judgment unit judges that an abnormality of the cooling performance is caused by a failure in the thermal conductive sheet when a difference between a currently calculated value and a previously calculated value of the coefficient α exceeds a range set in advance and the currently calculated value is greater than the previously calculated value.

According to the 6th aspect of the present invention, it is preferred that in a storage battery system according to the 1st aspect, the judgment unit judges that an abnormality of the cooling performance is caused by a failure in a cooling system of the secondary battery due to the cooling medium when a difference between a currently calculated value and a previously calculated value of the coefficient α exceeds a range set in advance and the currently calculated value is smaller than the previously calculated value.

According to the 7th aspect of the present invention, the judgment unit of a storage battery system according to the 6th aspect may increase the cooling performance of the cooling system when a failure of the cooling system of the secondary battery due to the cooling medium is judged.

According to the present invention, a cooling performance of a battery cooling system can be judged accurately.

DESCRIPTION OF PREFERRED EMBODIMENTS

Figure 1:
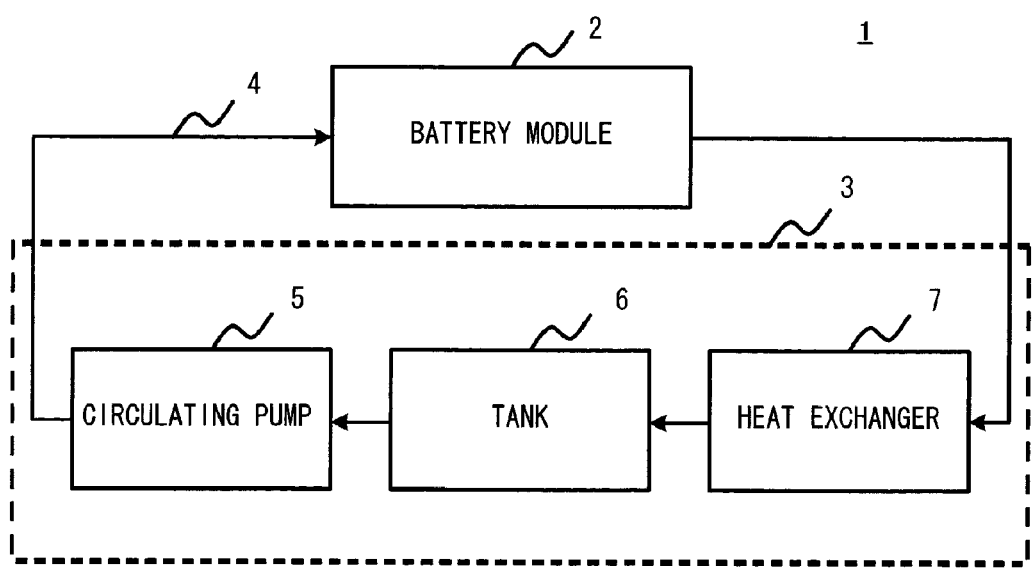
FIG. 1 is a diagram illustrating a configuration of a liquid-cooled storage battery system according to an embodiment.

FIG. 1 illustrates a configuration of a liquid-cooled storage battery system according to an embodiment. A storage battery system 1 according to the embodiment comprises a battery module 2, a cooling system 3, a cooling medium 4, and the like. The cooling system 3 circulates the cooling medium 4 to the battery module 2. The cooling medium 4 absorbs heat generated by the battery module 2 and transfers the heat to the outside of the battery module 2. For example, water, an antifreeze liquid, or the like can be used as the cooling medium 4. The liquid-cooling type cooling system 3 comprises a circulating pump 5, a tank 6, a heat exchanger 7, and the like. The circulating pump 5 supplies kinetic energy to the cooling medium 4 for sending the cooling medium 4 to the battery module 2. The tank 6 stores the cooling medium 4 to be circulated and supplies the cooling medium 4 to the circulating pump 5. The heat exchanger 7 cools the cooling medium 4 that has been reclaimed after absorbing the heat of the battery module 2 by heat exchange with the outside, and stores the cooling medium 4 in the tank 6.

Figure 2:
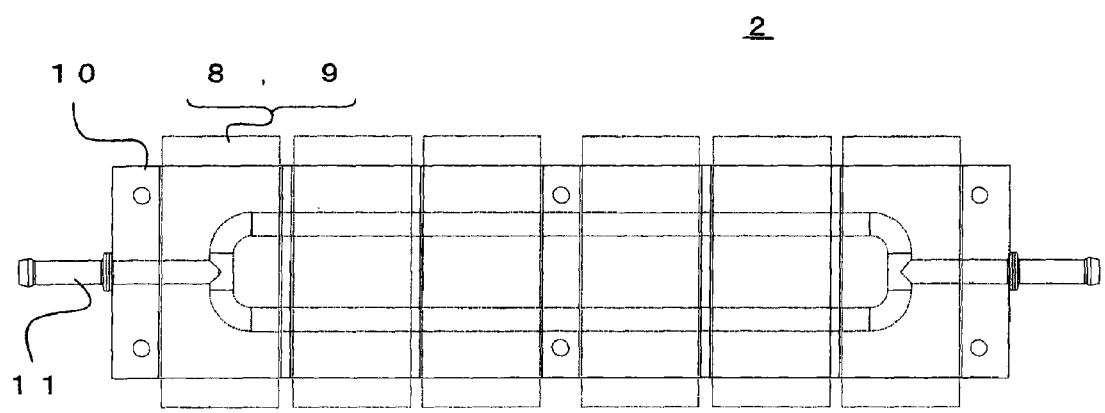
FIG. 2 is a diagram illustrating a partial configuration of a battery module illustrated in FIG. 1.

FIG. 2 illustrates a partial configuration of the battery module 2. In the battery module 2, a plurality of secondary batteries 8 is covered by a thermal conductive sheet 9 and held by a cooling block 10. While FIG. 2 illustrates a part of the battery module 2 in which six secondary batteries 8 are held by the cooling block 10, a large number of secondary batteries 8 are further built into the battery module 2 by similar structures. A cooling pipe 11 for passing the cooling medium 4 penetrates the inside of the cooling block 10. Moreover, while FIG. 2 illustrates an example in which the cooling pipe 11 splits into two branches at an entry-side of the inside of the cooling block 10 and converges at an exit side, a configuration and a method of piping of the cooling pipe 11 inside the cooling block 10 are not limited to those illustrated in FIG. 2.

Figure 3:
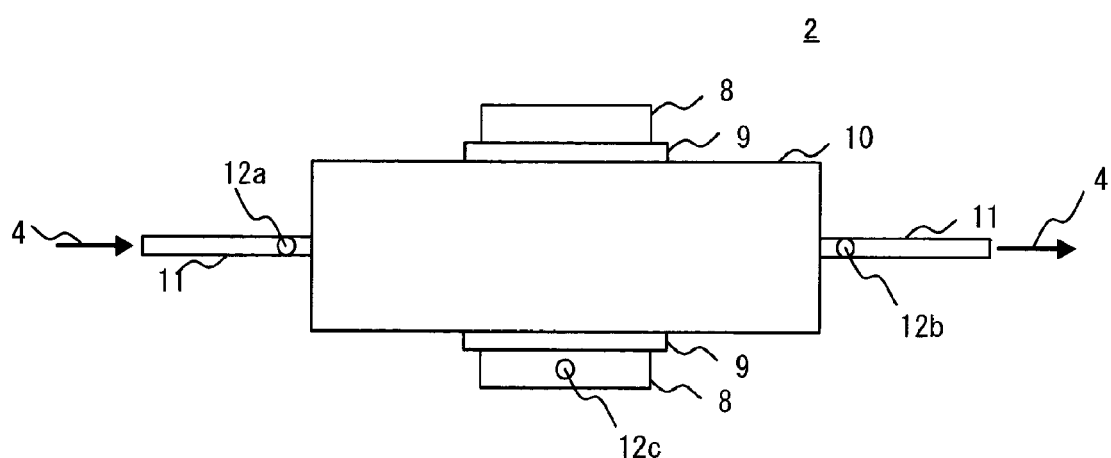
FIG. 3 is a side view illustrating, in enlargement, a portion of a single secondary battery of the battery module illustrated in FIG. 2.
Figure 4:
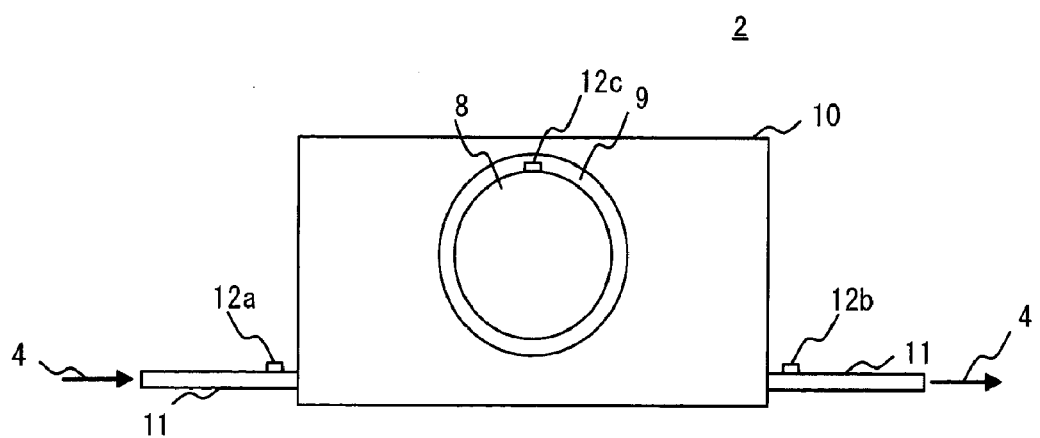
FIG. 4 is a top view illustrating, in enlargement, a portion of a single secondary battery of the battery module illustrated in FIG. 2.

FIGS. 3 and 4 illustrate an enlarged portion of a single secondary battery of the battery module 2, wherein FIG. 3 is a side view and FIG. 4 is a top view. The cylindrical secondary battery 8 is covered by the thermal conductive sheet 9 and held by the cooling block 10. The cooling pipe 11 for passing the cooling medium 4 is laid out inside the cooling block 10. The shape of the secondary battery 8 is not limited to a cylindrical shape and may be another shape such as a square or laminated shape.

Heat generated by the secondary battery 8 during charge and discharge is primarily transferred via the thermal conductive sheet 9 surrounding a circumference of a side surface of the secondary battery 8 and via the cooling block 10, and is absorbed by the cooling medium 4 that flows through the cooling pipe 11. The thermal conductive sheet 9 has a thickness of around 1 mm, features superior insulating performance and thermal conductivity in a thickness direction, has high sheet surface adhesion, and facilitates heat transfer while insulating the secondary battery 8 and the cooling block 10 from each other. Moreover, with a secondary battery structured such that a surface of the secondary battery does not have a potential and the battery surface may come into direct contact with the cooling block 10 without causing any problems, the insulating performance of the thermal conductive sheet 9 is not a requisite, and a structure may be adopted in which the secondary battery 8 is brought into direct contact with and held by the cooling block 10 without using the thermal conductive sheet 9. The cooling block 10 is formed of a metal with high thermal conductivity such as aluminum. In addition, the cooling pipe 11 is also metallic and penetrates the inside of the cooling block 10.

Temperature sensors 12$a$ and 12$b$ are respectively installed on a cooling block entry-side pipe surface and a cooling block exit-side pipe surface of the cooling pipe 11 to measure an entry-side cooling medium temperature Tin and an exit-side cooling medium temperature Tout. It is to be noted that while the installation location of the temperature sensor 12$a$ for measuring the entry-side cooling medium temperature Tin is desirably near a block inlet of the cooling pipe 11 that penetrates the inside of the cooling block 10, a location near the block entry-side is to suffice. In a similar manner, while the installation location of the temperature sensor 12$b$ for measuring the exit-side cooling medium temperature Tout is desirably near a block outlet of the cooling pipe 11 that penetrates the inside of the cooling block 10, a location near the block exit-side is to suffice. It is to be noted that in the battery module 2 where a plurality of secondary batteries 8 is held by a single cooling block 10 as illustrated in FIG. 2, the temperature sensors 12$a$ and 12$b$ may be installed near the block entry-side and the block exit-side of the cooling pipe 11 that penetrates the cooling block 10.

In addition, a temperature sensor 12$c$ is installed on a surface of the secondary battery 8 to measure a surface temperature Ts of the secondary battery 8. While the embodiment illustrates an example in which the surface temperature Ts of the secondary battery 8 is assumed to be a battery temperature, the battery temperature is not limited to the surface temperature of the secondary battery 8 and may instead be an internal temperature of the secondary battery 8.

Figure 5:
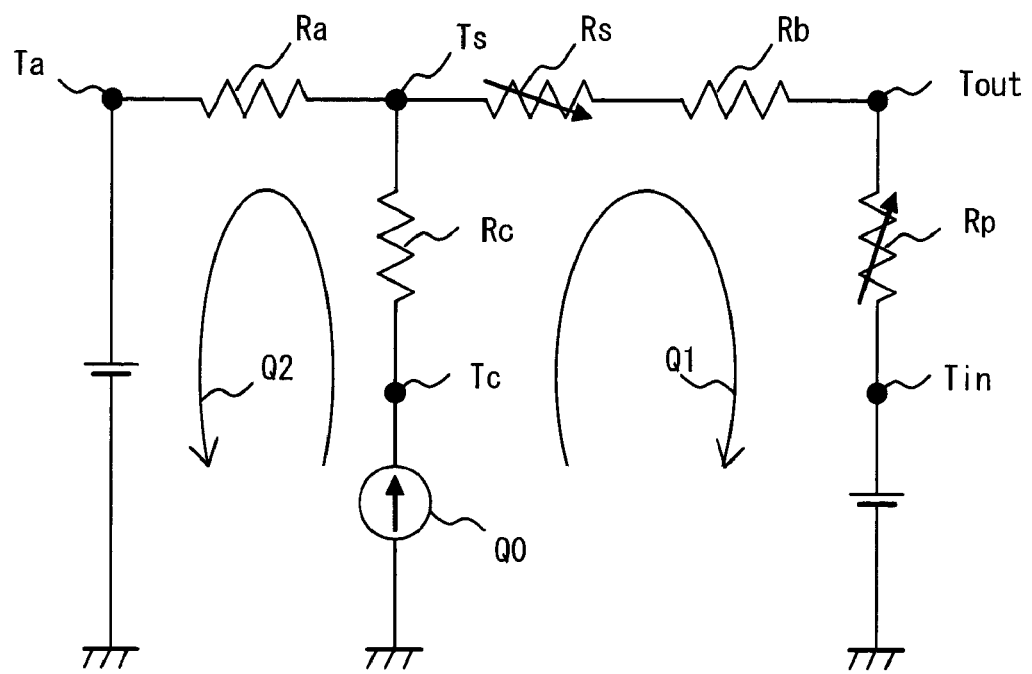
FIG. 5 is a diagram illustrating a thermal equivalent circuit around the single secondary battery illustrated in FIGS. 3 and 4.

FIG. 5 is a diagram illustrating a thermal equivalent circuit around the single secondary battery illustrated in FIGS. 3 and 4. In FIG. 5, Q0 denotes an amount of heat generated by the secondary battery 8, Rc denotes an internal thermal resistance of the secondary battery 8, Ra denotes an atmosphere thermal resistance, Rs denotes a thermal resistance of the thermal conductive sheet 9, Rb denotes a thermal resistance of the cooling block 10, and Rp denotes a thermal resistance of the cooling medium 4. In addition, as temperatures of each node of the thermal equivalent circuit, Ta denotes an ambient temperature, Tc denotes an internal temperature of the secondary battery 8, Ts denotes a surface temperature of the secondary battery 8, Tin denotes a block entry-side temperature of the cooling medium 4, and Tout denotes a block exit-side temperature of the cooling medium 4. Furthermore, an amount of heat absorbed by cooling medium Q1 and amount of heat discharged into atmosphere Q2 indicating a flow of heat are defined.

The respective parameters of the thermal equivalent circuit illustrated in FIG. 5 will be described in detail. The battery internal thermal resistance Rc defines a thermal resistance between the inside and the surface of the secondary battery 8, and the atmosphere thermal resistance Ra defines a thermal resistance between the surface of the secondary battery 8 and surrounding air. The ambient temperature Ta is a temperature of air surrounding the secondary battery 8 and is treated as a voltage source in an electric circuit. In addition, the thermal conductive sheet thermal resistance Rs defines a thermal resistance from the surface of the secondary battery 8 via the thermal conductive sheet 9 to the surface of the cooling block 10, and the cooling block thermal resistance Rb defines a thermal resistance from the surface of the cooling block 10 that is in contact with the thermal conductive sheet 9, through the inside of the cooling block 10 and a wall of the cooling pipe 11, and to the cooling medium 4. The cooling medium thermal resistance Rp defines a thermal resistance of the cooling medium 4 until the cooling medium 4 releases the heat absorbed in a cooling medium circulating pathway constituted by the cooling pipe 11 and the cooling system 3.

The amount of heat generated by battery Q0 is the amount of heat generated by the secondary battery 8 during charge and discharge, and is treated as a current source in an electric current. The cooling medium exit-side temperature Tout is a temperature of the cooling medium 4 on the cooling block exit-side of the cooling pipe 11 after the cooling medium 4 has absorbed heat. In addition, the cooling medium entry-side temperature Tin is a temperature of the cooling medium 4 cooled by the cooling system 3 and flowing into a cooling block entry-side of the pipe 11. The cooling medium entry-side temperature Tin can be arranged so as to be variable according to operation control of the heat exchanger 7 of the cooling system 3 and, in this case, is treated as a voltage source of in electric circuit.

The amount of heat generated by battery Q0 first flows via the battery internal thermal resistance Rc, and subsequently splits into the amount of heat absorbed by cooling medium Q1 that is an amount of heat absorbed by the cooling medium 4 and the amount of heat discharged into atmosphere Q2 that is an amount of heat discharged into air. In other words, the amount of heat generated by battery Q0 can be expressed as $$Q0=Q1+Q2 \quad (1)$$

As is obvious from the thermal equivalent circuit illustrated in FIG. 5, the amount of heat absorbed by cooling medium Q1 can be expressed as $$Q1=(Ts-Tin)/(Rs+Rb+Rp) \quad (2)$$

or $$Q1=(Ts-Tout)/(Rs+Rb) \quad (3)$$

or $$Q1=(Tout-Tin)/Rp \quad (4)$$

In addition, the amount of heat discharged into atmosphere Q2 can be expressed as $$Q2=(Ts-Ta)/Ra \quad (5).$$

Next, a method of judging deterioration of a cooling performance will be described. The superiority or inferiority of the cooling performance is judged based on whether or not the amount of heat generated by battery Q0 is being efficiently transferred by the cooling medium 4. In other words, it is conceivable that the higher the ratio of the amount of heat generated by battery Q0 being transferred as the amount of heat absorbed by cooling medium Q1, the greater the cooling performance. As illustrated in FIG. 5, the battery internal thermal resistance Rc, the thermal conductive sheet thermal resistance Rs, the cooling block thermal resistance Rb, and the cooling medium thermal resistance Rp exist in a pathway through which the amount of heat absorbed by cooling medium Q1 flows. Conceivably, an increase in these thermal resistances slows down the flow of the amount of heat absorbed by cooling medium Q1 and causes the cooling performance to deteriorate.

Among the thermal resistances in the pathway through which the amount of heat absorbed by cooling medium Q1 flows, the thermal conductive sheet thermal resistance Rs and the cooling medium thermal resistance Rp are susceptible to deterioration or variation over time. With the thermal conductive sheet thermal resistance Rs, an alteration of sheet material or a decrease in adhesion of the sheet surface makes it difficult for heat to be transferred from the surface of the secondary battery 8 to the cooling block 10. In addition, with the cooling medium thermal resistance Rp, an increase in the thermal resistances can conceivably occur due to contamination of impurities into the cooling medium 4 or by a component change of the cooling medium 4, an abnormal operation of the circulating pump 5, an increase of pressure loss caused by corrosion or a form change on a surface that comes into contact with the cooling medium 4 of the pipe 11 or the like constituting the flow channel of the cooling medium 4, and a reduction in a flow rate of the cooling medium 4 caused by these above.

In consideration thereof, with the storage battery system 1 according to an embodiment, in order to detect variations in the thermal conductive sheet thermal resistance Rs and the cooling medium thermal resistance Rp, temperature sensors 12a, 12b, and 12c are installed on the battery module 2 as illustrated in FIGS. 3 and 4 to measure the cooling medium entry-side temperature Tin, the cooling medium exit-side temperature Tout, and the battery surface temperature Ts. Furthermore, the right sides of expressions (2) and (4) that represent the amount of heat absorbed by cooling medium Q1 are connected by an equal sign and modified to define the coefficient α as represented by expression (6) below.

$$\alpha=(Ts-Tin)/(Tout-Tin)=(Rs+Rb+Rp)/Rp \quad (6)$$

The coefficient α can be calculated based on measured values of the cooling medium entry-side temperature Tin, the cooling medium exit-side temperature Tout, and the battery surface temperature Ts. Since coefficient α=(Rs+Rb+Rp)/Rp, an increase in the thermal conductive sheet thermal resistance Rs due to an abnormality of the thermal conductive sheet 9 is manifested as an increase of the coefficient α. In addition, an increase in the cooling medium thermal resistance Rp due to an abnormality of the cooling medium circulating system is manifested as a decrease of the coefficient α.

Figure 6:
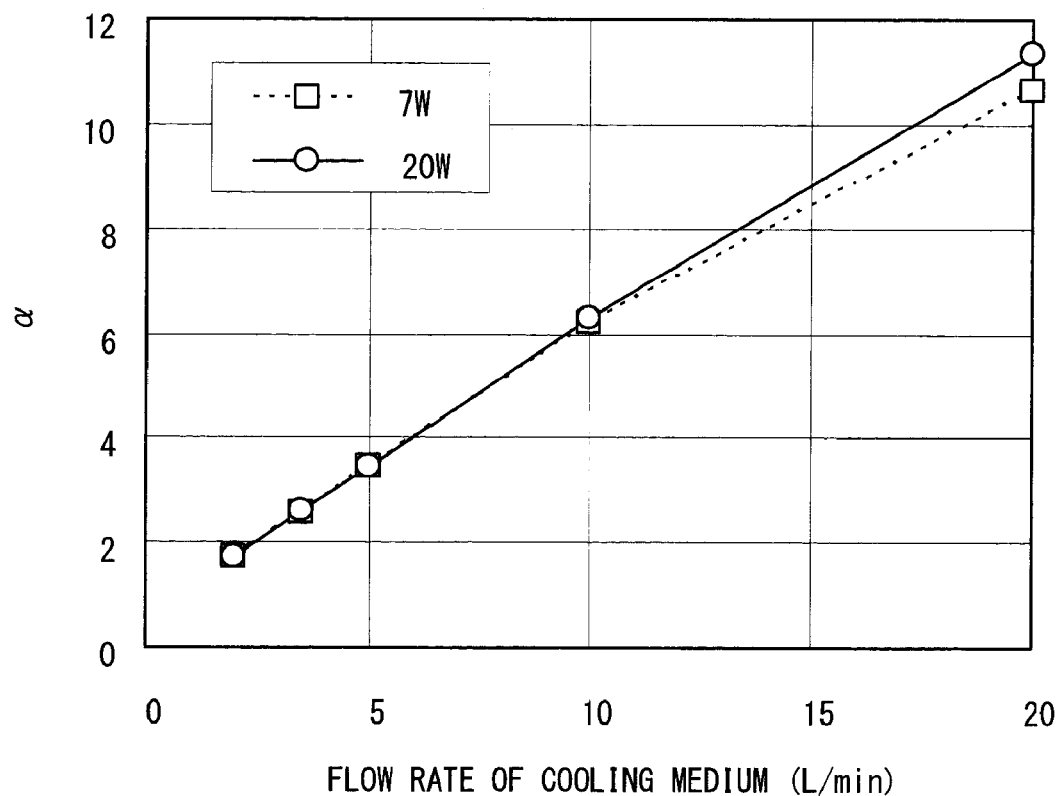
FIG. 6 is a diagram illustrating relationships of a coefficient α with respect to a cooling medium flow rate when an amount of heat generated per one secondary battery is set to 7 W and 20 W.
Figure 7:
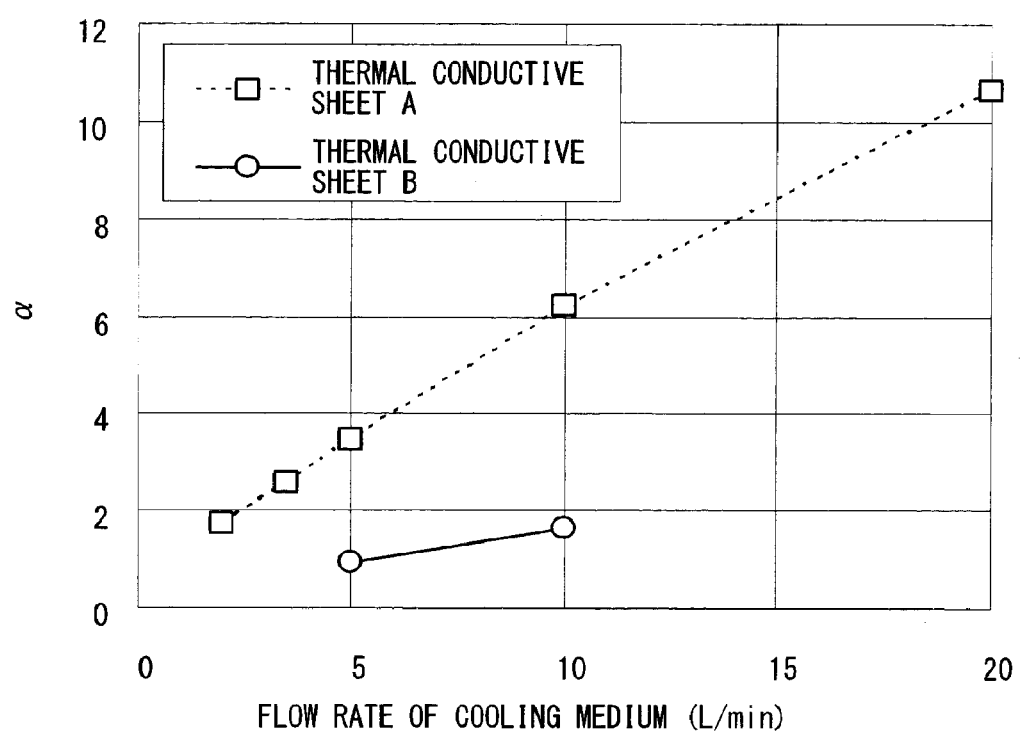
FIG. 7 is a diagram illustrating relationships of a coefficient α with respect to a cooling medium flow rate in two types of thermal conductive sheets having different thermal conductive properties.

FIGS. 6 and 7 illustrate relationships of the coefficient α with respect to cooling medium flow rate. The relationships have been created from results of a thermal analysis by simulation performed on a liquid-cooled battery module 2 mounted with 72 secondary batteries 8. In addition, surface temperature information of a single secondary battery 8 at a representative position has been adopted as the battery surface temperature Ts. Referring to the drawings, variations in the coefficient α due to abnormalities of the thermal conductive sheet 9 and the cooling medium circulating system will be described.

FIG. 6 illustrates relationships of the coefficient α with respect to cooling medium flow rate when an amount of heat generation per one secondary battery 8 is set to 7 W and 20 W. These relationships correspond to cases where the amount of heat generation Q0 of the secondary battery 8 is varied. As represented by the expression (6) above, the coefficient α does not include the amount of heat generated by battery Q0 and therefore is not dependent on the amount of heat generated by battery Q0, and remains approximately constant even if the amount of heat generated by battery Q0 varies. However, the coefficient α tends to increase as the flow rate increases. Therefore, when the cooling medium flow rate decreases due to an abnormality in the cooling medium circulating system, the coefficient α is expected to decrease.

FIG. 7 illustrates relationships between cooling medium flow rate and the coefficient α with respect to two types of thermal conductive sheets 9 having different thermal conductive properties. A thermal conductive sheet A represents a thermal analysis simulation performed under conditions in which a thermal conductivity of 1 W/m·K and a sheet thickness of 1.0 mm are respectively set, and a thermal conductive sheet B represents a thermal analysis simulation performed under conditions in which a thermal conductivity of 3 W/m·K and a sheet thickness of 0.1 mm are respectively set. Under these conditions, the thermal resistance Rs of the thermal conductive sheet 9 is smaller for the thermal conductive sheet B than the thermal conductive sheet A. When comparing both thermal conductive sheets at the same flow rate of the cooling medium 4, the coefficient α is greater for the thermal conductive sheet A than the thermal conductive sheet B. In other words, in a case where the thermal resistance Rs increases due to an abnormality of the thermal conductive sheet 9, the coefficient α is expected to increase.

As described above, by installing the temperature sensors 12a, 12b, and 12c on the battery module 2 to measure the cooling medium entry-side temperature Tin, the cooling medium exit-side temperature Tout, and the battery surface temperature Ts, and calculating the coefficient α and comparing the coefficient α with a coefficient α in previous history, a state of the cooling performance of the battery module 2 can be accurately detected and the cooling performance of the battery module 2 can be accurately judged. In addition, according to an increase/decrease of the calculated coefficient α, whether a reduction in cooling performance is due to the cooling system 3 by the cooling medium 4 or to an abnormality of the thermal conductive sheet 9 can be identified. Furthermore, since the coefficient α is not dependent on the amount of heat generation Q0 of the secondary battery 8, the cooling performance can be detected and judged regardless of the load or operating state of the storage battery system 1.

In the embodiment described above, as represented by the expression (6), an example has been illustrated where the coefficient α is defined as a ratio between (Ts−Tin) and (Tout−Tin). However, as represented by the expression (3) above, since the amount of heat absorbed by cooling medium Q1 can also be expressed using (Ts−Tout), two coefficients α' and α" expressed the expressions (7) and (8) as follows can be obtained, and even when the aforementioned coefficient α is replaced with the coefficients α' and α", an index may be obtained for detecting an increase in the thermal conductive sheet thermal resistance Rs or the cooling medium thermal resistance Rp.

$$\alpha'=(Ts-Tout)/(Ts-Tin)=(Rs+Rb)/(Rs+Rb+Rp) \quad (7)$$

and $$\alpha''=(Ts-Tout)/(Tout-Tin)=(Rs+Rb)/Rp \quad (8)$$

In addition, in the above embodiment, an example in which the thermal conductive sheet 9 is sandwiched between the secondary battery 8 and the cooling block 10 has been described as illustrated in FIGS. 3 to 5. However, in a case where the secondary battery 8 is structured such that the surface thereof does not have a potential, the secondary battery 8 and the cooling block 10 may be directly bonded, metal against metal, to each other in a thermal bonding without sandwiching the thermal conductive sheet 9. For example, conceivably, the secondary battery 8 and the cooling block 10 may be welded to each other or mechanically connected with each other by fastening using a bracket or a screw.

In a case where the secondary battery 8 is directly held by the cooling block 10, the thermal conductive sheet thermal resistance Rs of the thermal equivalent circuit illustrated in FIG. 5 can be omitted, whereby the coefficient α may be expressed as $$\alpha=(Ts-Tin)/(Tout-Tin)=(Rb+Rp)/Rp \quad (9)$$

Accordingly, even when the thermal conductive sheet 9 is not present, in the same manner as the embodiment described above, an increase of the cooling medium thermal resistance Rp is manifested as a decrease in the coefficient α and an abnormality in the cooling medium circulating system can be detected.

Next, a configuration of a control system of the storage battery system 1 according to an embodiment will be described with reference to FIG. 8. Besides the components of the cooling system of the storage battery system 1 illustrated in FIG. 1, the control system comprises a controller 13, a memory 14, an indicator 15, a pump control signal 16, a heat exchanger control signal 17, indication information 18, a cooling medium entry-side temperature signal STin, a cooling medium exit-side temperature signal STout, a battery surface temperature signal STs, and the like. The controller 13 is constituted by a microcomputer including an interface such as an AD converter and controls arithmetic processing and input/output of information and signals. The memory 14 stores an initial value and historical values of the coefficient α. The indicator 15 is a device such as a display, a lamp, a speaker, or the like that visually or auditorily informs a state of the cooling performance.

The pump control signal 16 is a signal for controlling a motor rotation speed or the like of the circulating pump 5, and the heat exchanger control signal 17 is a signal for controlling operations of the heat exchanger 7. In addition, indication information 18 is information to be indicated on the indicator 15. The cooling medium entry-side temperature signal STin, the cooling medium exit-side temperature signal STout, and the battery surface temperature signal STs are respectively outputs of the temperature sensors 12a, 12b, and 12c in the battery module 2 illustrated in FIGS. 3 and 4.

Figure 9:
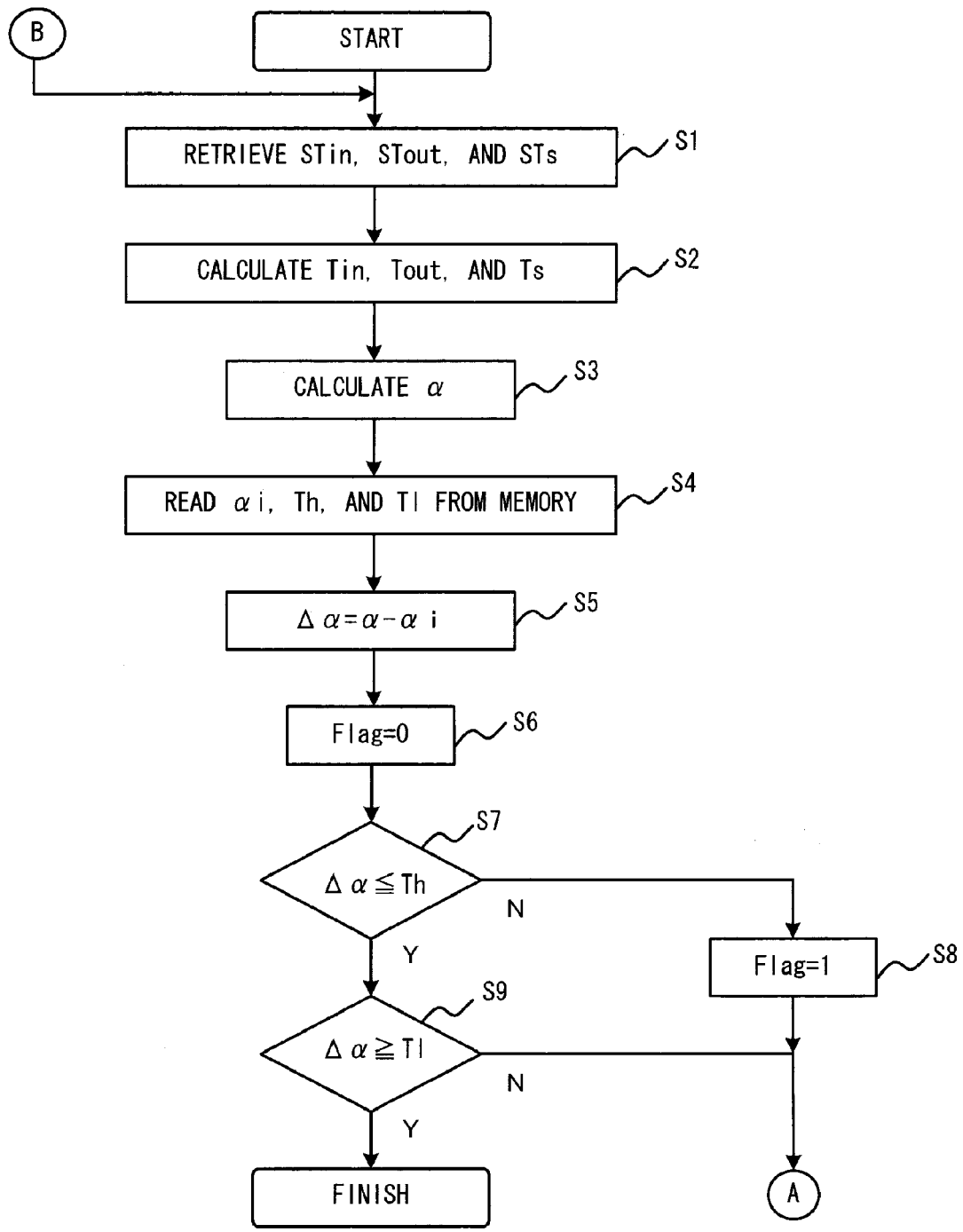
FIG. 9 is a flow chart illustrating an example of a process for performing measurement and judgment of cooling performance.

A process performed by the controller 13 to measure and judge cooling performance will be described with reference to FIGS. 9 to 11. FIG. 9 is a flow chart illustrating an example of a process for measuring and judging the cooling performance. In step 1, the controller 13 retrieves the cooling medium entry-side temperature signal STin, the cooling medium exit-side temperature signal STout, and the battery surface temperature signal STs from the sensors 12a, 12b, and 12c, and reads a voltage value or a current value of these signals. In a next step 2, the controller 13 obtains a cooling medium entry-side temperature Tin, a cooling medium exit-side temperature Tout, and a battery surface temperature Ts based on the signals STin, STout, and STs from the sensors 12a, 12b, and 12c. Furthermore, in step 3, the controller 13 calculates the coefficient α=(Ts−Tin)/(Tout−Tin) by using the cooling medium entry-side temperature Tin, the cooling medium exit-side temperature Tout, and the battery surface temperature Ts.

In step 4, the controller 13 reads a coefficient historical value αi of the coefficient α stored in the memory 14, and in step 5, the controller 13 compares the coefficient α with the coefficient historical value αi and obtains a difference Δα. In step 6, the controller 13 sets a flag "Flag" that denotes an abnormal state of the cooling performance to 0. In step 7, the controller 13 reads an upper limit threshold Th set in advance from the memory 14 and compares the difference $\Delta\alpha$ with the upper limit threshold Th. When the difference $\Delta\alpha$ is equal to or lower than the upper limit threshold Th, the controller 13 judges that the cooling performance is normal and proceeds to step 9. Otherwise, the controller 13 judges that the cooling performance is abnormal and proceeds to step 8. When the controller 13 judges that the cooling performance is abnormal, the controller 13 sets the flag "Flag" to 1 in step 8 and proceeds to step 11 in FIG. 10 (or step 11 in FIG. 11). On the other hand, when the controller 13 judges that the cooling performance is normal, in step 9, the controller 13 reads a lower limit threshold Tl set in advance from the memory 14 and compares the difference $\Delta\alpha$ with the lower limit threshold Tl. When the difference $\Delta\alpha$ is equal to or higher than the lower limit threshold Tl, the controller 13 judges that the cooling performance is normal and ends the judgment process. Otherwise, the controller 13 judges that the cooling performance is abnormal and proceeds to step 11 in FIG. 10 (or step 11 in FIG. 11).

Figure 10:
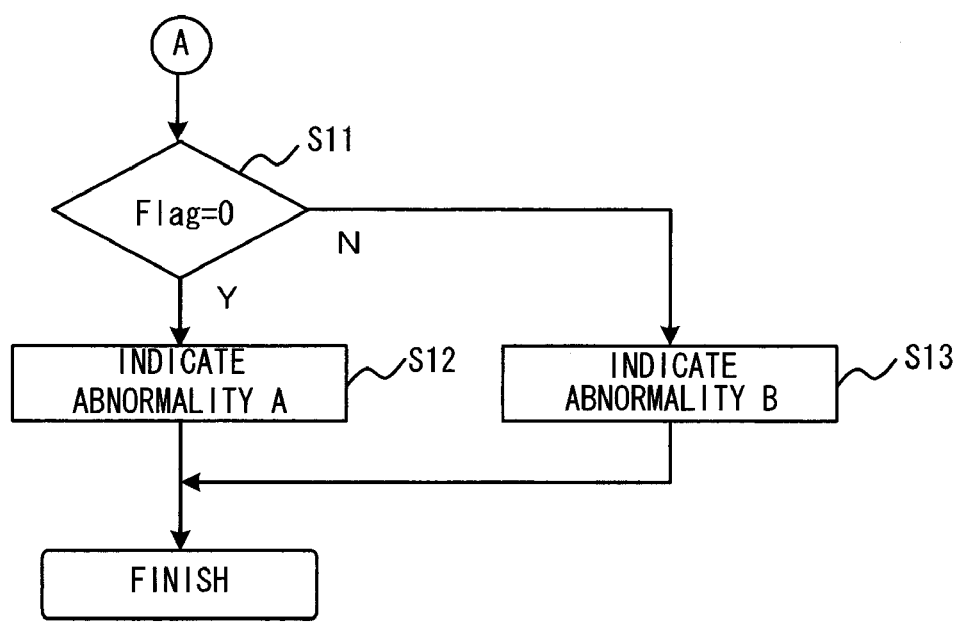
FIG. 10 is a flow chart illustrating an example of a process when cooling performance is judged to be abnormal.

FIG. 10 is a flow chart illustrating an example of a process when the cooling performance is judged to be abnormal by the controller 13. In step 11, the controller 13 sets indication information 18 to be outputted to the indicator 15 according to the value of the flag "Flag" denoting an abnormal state of cooling performance. When flag "Flag"=0, the controller 13 proceeds to step 12 to indicate an abnormality "A" on the indicator 15, and when flag "Flag"=1, the controller 13 proceeds to step 13 to indicate an abnormality "B" on the indicator 15. An abnormality "A" indicates that the coefficient $\alpha$ has become abnormally smaller than the coefficient historical value $\alpha i$ using an error code or a message, an indication state of the lamp, or the like. On the other hand, an abnormality "B" indicates that the coefficient $\alpha$ has become abnormally greater than a coefficient initial value $\alpha 0$ using an error code or a message, an indication state of the lamp, or the like by a method that differs from that of the abnormality "A". An abnormality of the cooling medium circulating system is suspected in the case of the abnormality "A", and a deterioration of the thermal conductive sheet is suspected in the case of the abnormality "B".

Figure 11:
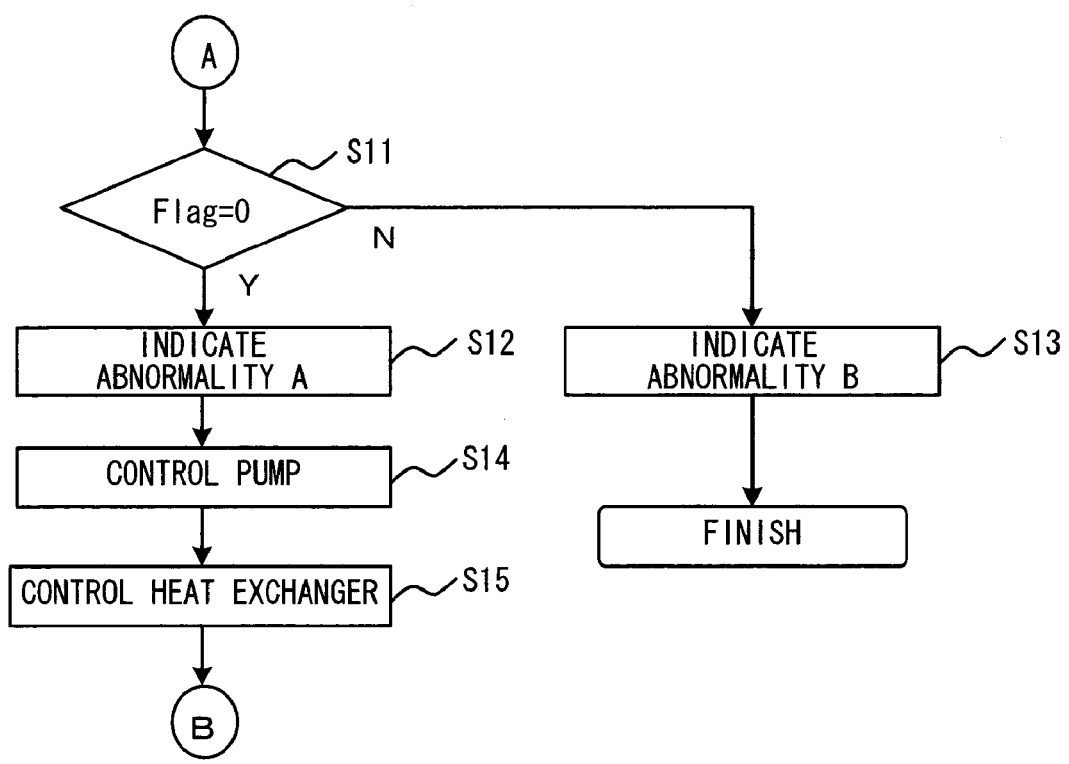
FIG. 11 is a flow chart illustrating another example of a process when cooling performance is judged to be abnormal.

FIG. 11 is a flow chart illustrating another example of a process when the cooling performance is judged to be abnormal by the controller 13. In step 11, the controller 13 sets indication information 18 to be outputted to the indicator 15 according to the value of the flag "Flag" denoting an abnormal state of cooling performance. When flag "Flag"=0, the controller 13 proceeds to step 12 to indicate the abnormality "A" on the indicator 15, and when flag "Flag"=1, the controller 13 proceeds to step 13 to indicate the abnormality "B" on the indicator 15. Since an abnormality of the cooling medium circulating system is suspected in the case of the abnormality "A", depending on the degree of the abnormality, changing operations of the circulating pump 5 or the heat exchanger 7 may suffice as a countermeasure. Therefore, in step 14, the controller 13 increases the motor rotation speed of the circulating pump 5 and controls the pump so as to increase the flow rate of the cooling medium 4. Furthermore, in step 15, the controller 13 controls the heat exchanger so as to lower a target temperature of the cooling medium 4 that is cooled by the heat exchanger 7. Subsequently, the controller 13 returns to step 1 in FIG. 9 to once again execute a calculating process of the coefficient $\alpha$ so that the difference $\Delta\alpha$ eventually falls between the upper limit threshold Th and the lower limit threshold Tl.

In the cooling performance judgment process illustrated in FIG. 9, an example has been presented in which the controller 13 compares a measured coefficient $\alpha$ with a coefficient historical value $\alpha i$ and judges the cooling performance based on the comparison result. The controller 13 stores the coefficient $\alpha$ at predetermined time intervals from an initial value as coefficient historical values $\alpha i$ in the memory 14, and executes a process for detecting a tendency time-dependent variation of the coefficient historical values $\alpha i$. By this detection process, the controller 13 judges whether a measured coefficient $\alpha$ is consistent with the variation tendency of the coefficient historical values $\alpha i$ or is an abrupt variation. When the coefficient $\alpha$ has varied abruptly, an occurrence of some kind of abnormality is presumed in cooling performance, whereby a cause of the abnormality can be identified as described above from an increase or decrease of the coefficient $\alpha$. Accordingly, the accuracy of judgment of the cooling performance can be improved and abnormalities can be processed more precisely.

Figure 12:
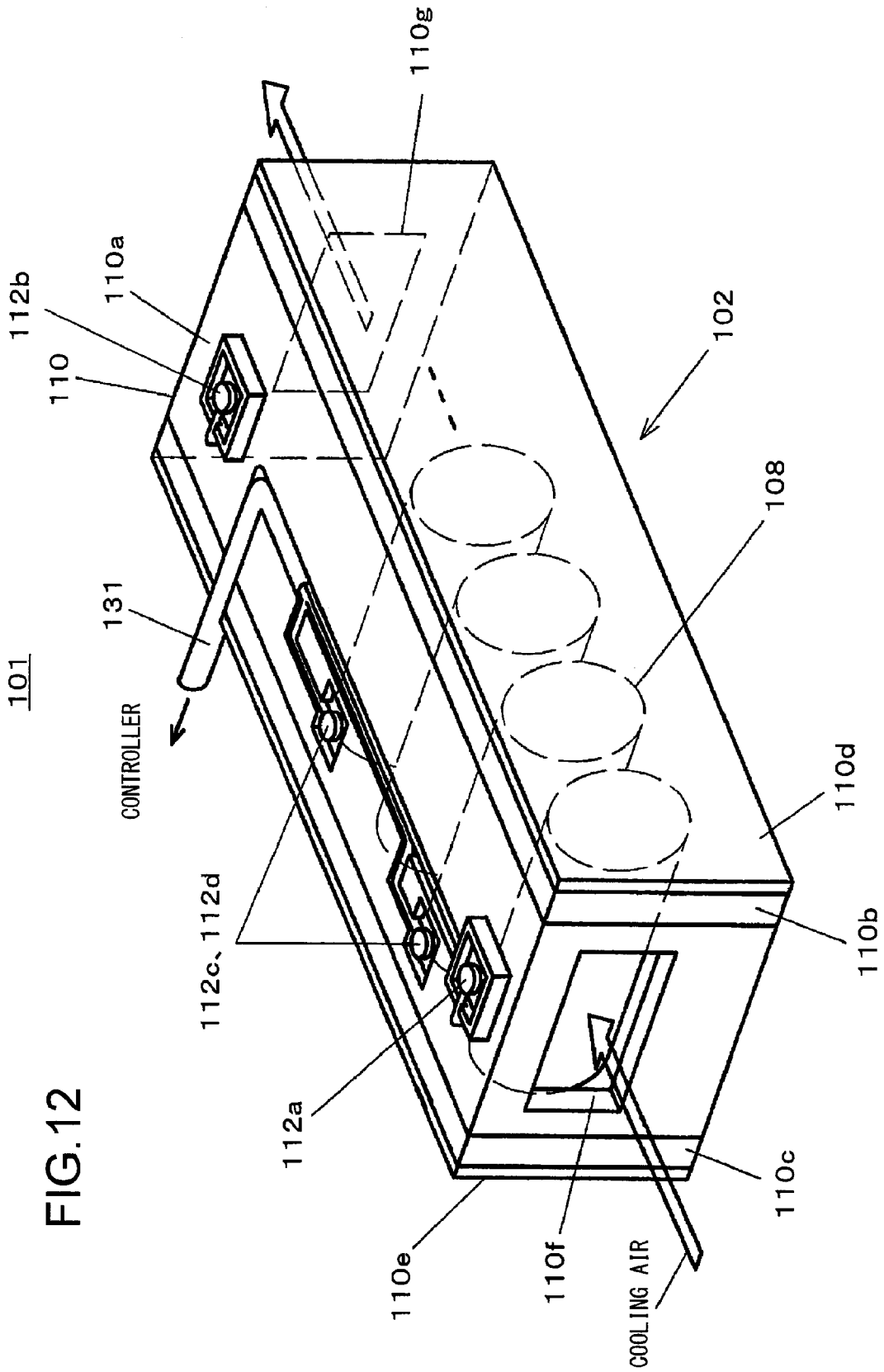
FIG. 12 is a perspective view illustrating a battery module of an air-cooled storage battery system according to an embodiment.

While an example of a liquid-cooled storage battery system 1 has been described as the above embodiment of the present invention, the present invention can also be applied to an air-cooled storage battery system. FIG. 12 is a perspective view illustrating a battery module 102 of an air-cooled storage battery system 101 according to an embodiment. In the battery module 102 of the air-cooled storage battery system 101, an approximately cuboid chassis block 110 internally holds a plurality of secondary batteries 108. The chassis block 110 is constituted by five resin or resin-molded chassis members 110a to 110e, and a plurality of cylindrical secondary batteries 108 are held within the chassis block 110.

A cooling air inlet 110f is formed on one end in a longitudinal direction of the chassis block 110, and a cooling air outlet 110g is formed on another end of the chassis block 110. In other words, a cooling air passage is formed along the longitudinal direction in the chassis block 110, and the plurality of secondary batteries 108 is arranged in a single row along the cooling air passage in the chassis block 110. It is to be noted that while an example in which the secondary batteries 108 are arranged in a single row along the longitudinal direction of the chassis block 110 is shown in the air-cooled battery module 102 illustrated in FIG. 12, the arrangement of the secondary batteries 108 in the chassis block 110 is not limited to this example.

Temperature sensors 112a, 112b, 112c, and 112d are installed in the chassis block 110. The temperature sensor 112a is arranged near the cooling air inlet 110f of the chassis block 110 and outputs an entry-side cooling medium (in this case, cooling air) temperature signal STin. The temperature sensor 112b is arranged near the cooling air outlet 110g of the chassis block 110 and outputs an exit-side cooling medium (in this case, cooling air) temperature signal STout. In addition, the temperature sensors 112c and 112d are arranged on surfaces of two representative secondary batteries among the secondary batteries 108 held in the chassis block 110 and output surface temperature signals STs of the secondary batteries 108. Output signal lines of the sensors 112a to 112d are bundled by a harness 131 and connected to the controller 13 illustrated in FIG. 8.

A cooling system (corresponding to the liquid cooling-type cooling system 3 illustrated in FIG. 1) constituted by an air-conditioning duct and a cooling fan, not shown, is connected to the air-cooled battery module 102 illustrated in FIG. 12, and air is blown by the cooling fan to the secondary batteries 108 in the battery module 102 through the air-conditioning duct. The cooling fan is controlled by a fan control signal (not shown) from the controller 13 illustrated in FIG. 8.

Figure 8:
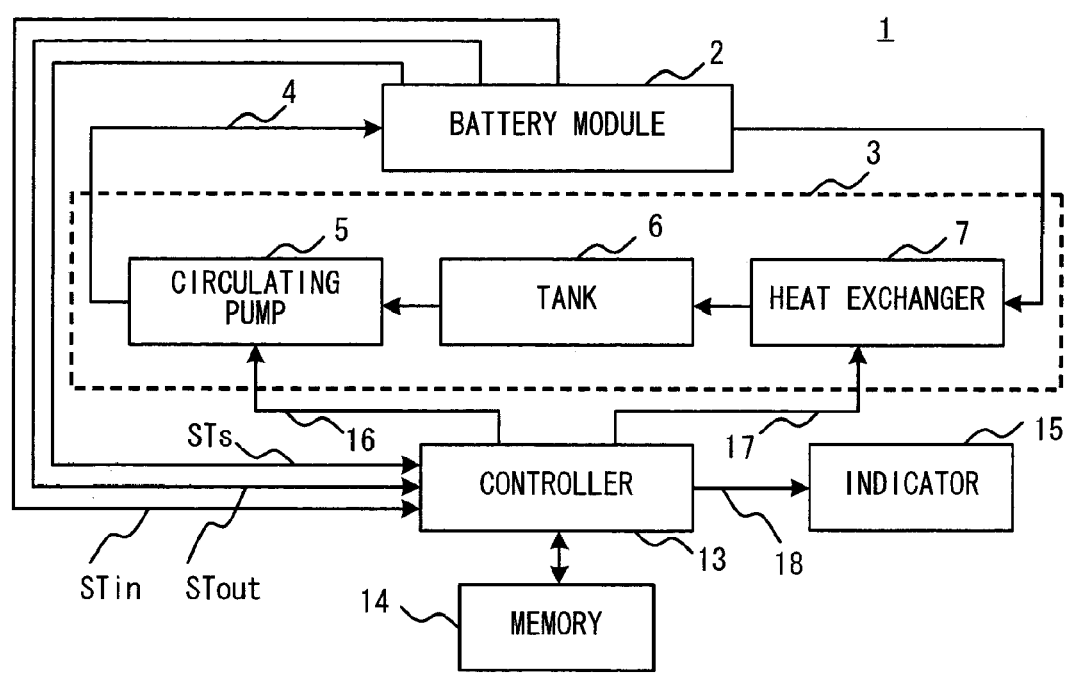
FIG. 8 is a diagram illustrating a configuration of a control system of a storage battery system according to an embodiment.

A configuration of a control system of the air-cooled battery module 102 is similar to that of the control system of the aforementioned liquid-cooled battery module 2 which is constituted by a controller, an indicator, a memory, and the like and which is illustrated in FIG. 8, and a depiction and a description thereof will be omitted.

With such an air-cooled storage battery system 101, a thermal conductive sheet is no longer necessary. Measurement and judgment of a cooling performance of the air-cooled storage battery system 101 are similar to the measurement and judgment of the liquid-cooled storage battery system 1 with the omission of the thermal conductive sheet.

In the embodiment and the modification thereof described above, as illustrated in FIG. 8, examples have been presented where the cooling performances of the battery modules 2 and 102 are detected and judged by the controller 13 and the memory 14 provided outside of the battery modules 2 and 102. Alternatively, a configuration may be adopted in which the controller 13 and the memory 14 are provided inside the battery modules 2 and 102 and a signal of the abnormality "A" or the abnormality "B" described above that is a judgment result is outputted to a higher-level control device located outside of the battery modules 2 and 102.

It is to be noted that any combination of the embodiments and the modifications thereof described above including a combination of embodiments and a combination of an embodiment and a modification is possible.

According to the embodiments and modifications thereof described above, the following operational advantages can be gained. First, a secondary battery is held by a holding member (the aforementioned cooling block, chassis block, or the like) having a flow channel (the aforementioned cooling pipe, cooling air flow channel, or the like) of a cooling medium that cools the secondary battery. Next, temperatures T1 and T2 of the cooling medium taken at two locations in the flow channel and a temperature T3 of the secondary battery are measured, a coefficient α defined as (T3−T1)/(T2−T1), (T3−T2)/(T2−Ti), or (T3−T2)/(T3−T1) is repetitively calculated, and the cooling performance of the secondary battery is judged based on a variation of the coefficient α. As a result, the cooling performance of the battery cooling system can be accurately judged based on measured values and without using estimated values.

In addition, according to an embodiment and a modification thereof, the cooling performance of the secondary battery is judged to be abnormal when a difference between a currently calculated value and a previously calculated value of the coefficient α exceeds a range set in advance. Therefore, the cooling performance of the battery cooling system can be judged accurately.

According to an embodiment and a modification thereof, temperatures Tin and Tout at an entry-side and an exit-side of the aforementioned holding member of a flow channel passing through the holding member are measured, whereby the coefficient α is calculated assuming that T1=Tin and T2=Tout. Therefore, the coefficient α can be calculated which enables the cooling performance of the battery cooling system to be judged accurately.

According to an embodiment and a modification thereof, the cooling performance of the battery cooling system can be accurately judged even with a holding member (the aforementioned cooling block, chassis block, or the like) having a structure in which the secondary battery is held via a thermal conductive sheet.

According to an embodiment and a modification thereof, an abnormality of the cooling performance is judged to be caused by a failure in the thermal conductive sheet when a difference between a currently calculated value and a previously calculated value of the coefficient α exceeds a range set in advance and the currently calculated value is greater than the previously calculated value. As a result, a cause of an abnormality of the cooling performance of the battery cooling system can be identified.

According to an embodiment and a modification thereof, an abnormality of the cooling performance is judged to be caused by a failure in a battery cooling system due to a cooling medium when a difference between a currently calculated value and a previously calculated value of the coefficient α exceeds a range set in advance and the currently calculated value is smaller than the previously calculated value. Therefore, a cause of an abnormality of the cooling performance of the battery cooling system can be identified.

According to an embodiment and a modification thereof, since the cooling performance of the battery cooling system is increased when a failure of the battery cooling system due to the cooling medium is judged, the failure of the battery cooling system can be solved.

The above described embodiments are examples, and various modifications can be made without departing from the scope of the invention.

What is claimed is:

1. A liquid-cooled storage battery system comprising:
   a secondary battery;
   a holding member comprising a flow channel of a cooling medium for cooling the secondary battery, which holds the secondary battery;
   a cooling medium temperature measuring unit that measures temperatures T1 and T2 of the cooling medium at two locations in the flow channel;
   a battery temperature measuring unit that measures a temperature T3 of the secondary battery; and
   a judging unit that repetitively calculates a coefficient α to detect a change of thermal conductive properties of members arranged between the secondary battery and the cooling medium so that a cooling performance of the secondary battery based on a variation of the coefficient α is judgeable, the coefficient α being defined as (T3−T1)/(T2−T1), (T3−T2)/(T2−T1), or (T3−T2)/(T3−T1);
   wherein the flow channel and the holding member are formed of a metal and the flow channel penetrates the inside of the holding member.

2. A liquid-cooled storage battery system according to claim 1, wherein
   the judging unit is configured to judge that the cooling performance of the secondary battery is abnormal when a difference between a currently calculated value and a previously calculated value of the coefficient α exceeds a range set in advance.

3. A liquid-cooled storage battery system according to claim 1, wherein
   the medium temperature measuring unit measures temperatures T1 and T2 at an entry-side and an exit-side of the holding member of the flow channel passing through the holding member.

4. A liquid-cooled storage battery system according to claim 1, wherein
   the holding member holds the secondary battery via a thermal conductive sheet.

5. A liquid-cooled storage battery system according to claim 4, wherein
   the judging unit is configured to judge that an abnormality of the cooling performance is caused by a failure in the thermal conductive sheet when a difference between a currently calculated value and a previously calculated value of the coefficient α exceeds a range set in advance and the currently calculated value is greater than the previously calculated value.

6. A liquid-cooled storage battery system according to claim 1, wherein
the judging unit is configured to judge that an abnormality of the cooling performance is caused by a failure in a cooling medium circulating system when a difference between a currently calculated value and a previously calculated value of the coefficient α exceeds a range set in advance and the currently calculated value is smaller than the previously calculated value.

7. A liquid-cooled storage battery system according to claim 6, wherein
the judging unit increases the cooling performance of the cooling medium circulating system when a failure of the cooling medium circulating system is judged.

* * * * *